Figure 1:
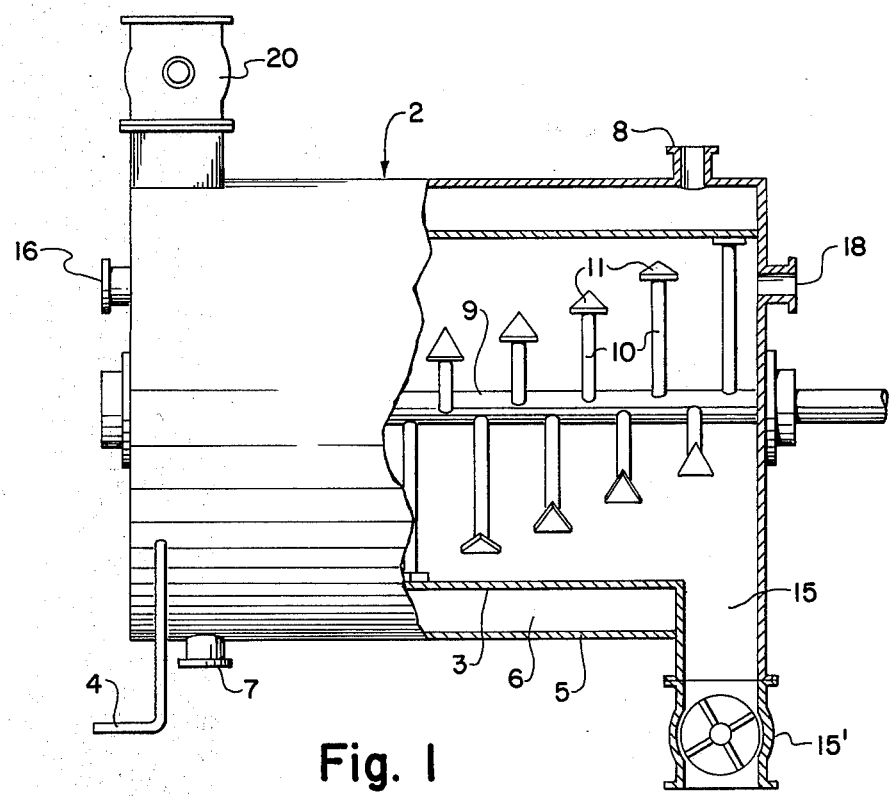

United States Patent [19]

Malcolm

[11] 3,889,391
[45] June 17, 1975

[54] METHOD OF AND APPARATUS FOR DRYING PARTICULATE MINERALS FOR AGGLOMERATION

[75] Inventor: Donald B. Malcolm, Pittsburgh, Pa.
[73] Assignee: Dravo Corporation, Pittsburgh, Pa.
[22] Filed: Feb. 28, 1974
[21] Appl. No.: 446,715

[52] U.S. Cl. .................. 34/33; 34/136; 34/141; 34/182
[51] Int. Cl.² .......................................... F26B 3/00
[58] Field of Search .................. 34/26–29, 179, 34/180, 181, 182, 183, 135, 136, 137, 140, 141, 142, 109, 30, 31, 33; 165/87, 94, 92; 259/5–7, 9; 432/103, 105, 107, 108, 109

[56] References Cited
UNITED STATES PATENTS

| | | | |
|---|---|---|---|
| 591,986 | 10/1897 | Morris | 34/181 |
| 676,165 | 6/1901 | Wacker | 34/182 |
| 2,627,668 | 2/1953 | Handwerk | 34/182 |
| 3,384,974 | 5/1968 | Alleman et al. | 34/136 |
| 3,701,713 | 10/1972 | Bennett et al. | 34/182 |

Primary Examiner—John J. Camby
Assistant Examiner—James C. Yeung
Attorney, Agent, or Firm—Parmelee, Miller, Welsh & Kratz

[57] ABSTRACT

In a process for reducing the water content in ore concentrates and other particulate materials for agglomeration, the filter cake or other water-containing ore is passed through a high-intensity type mixer, the walls of which are heated so that small batches of material are hurled by the mixer plows against the hot surface, effecting almost instant evaporation of surface moisture and eliminating or reducing adherence of the mass on said walls. Steam or vapor so generated is removed by forced circulation of heated air through the mixer, or reduced pressure may be maintained in the mixer by a vacuum pump.

5 Claims, 2 Drawing Figures

METHOD OF AND APPARATUS FOR DRYING PARTICULATE MINERALS FOR AGGLOMERATION

This invention relates to the agglomeration of ore concentrates and like finely-divided minerals which may have a higher percentage of moisture than desired, and more particularly it is for drying or partially drying concentrate such as filter cake where the material is compacted and relatively impervious to air and the retained water is above a preferred range for making sound pellets.

In some iron ore beneficiation processes, to be specific and without excluding the processing of other ores and minerals to which this invention may apply, the ore concentrates are recovered as filter cake resulting from a filtering operation. The finely-divided particles must be agglomerated into pellets, briquettes or other formed bodies for subsequent use in a blast furnace or other metal recovery process by procedures well known in the art. The ore comprising the filter cake, for example, is formed into pellets, which are referred to as "green pellets" and these usually are subsequently fired or heat-indurated at elevated temperature to develop the required strength for transportation, storage and eventual use without breaking in a blast furnace or other metallurgical furnace, although in some cases baking or drying of the agglomerates may be adequate.

Generally a filter, including a vacuum filter, can be economically operated only to a point where more water remains in the filter cake than is desirable for the production of good pellets or other formed agglomerates. In some cases operators may use the filter cake even though the water content is higher than desirable, and in some cases an adsorbent earth such as bentonite is added even though the introduction of an inert material increases cost as well as increasing the bulk required to be fired, transported and to be eventually dealt with in the blast furnace or other operation where the pellets are used. On the other hand, if the green pellets are too wet, poor bed permeability to firing gases in drying and/or heat hardening the pellets results, as well as increasing costs of hardening the pellets and lowering production. To overcome this difficulty, present practice generally involves mixing an adsorbent earth such as bentonite with the filter cake. While a small amount of bentonite may be desirable, amounts necessary to take up the excess water generally impair the quality of the pellets or other agglomerates, increase cost, and introduce inert bulk to be fired, transported, and eventually dealt with in the blast furnace or other operation where the pellets are used.

BRIEF SUMMARY OF THE INVENTION

According to this invention the filter cake is introduced into a so-called high-intensity industrial mixer of the type wherein there is a jacketed horizontally-extending barrel or cylinder through which an axial power-driven shaft extends. This shaft has radial arms projecting therefrom at various angles to each other with plows or plow-shares or blade elements of some kind at their outer ends that have a working clearance with the interior of the shell. Hot oil, steam or other hot fluid is circulated through the jacket so as to keep the interior walls heated.

Mixers such as this are intended for use in mixing together various ingredients to completely and thoroughly blend them. With the present invention provision is made either for maintaining a partial vacuum therein or circulating a current of purging air therethrough. The filter cake which may vary in its cohesiveness is typically of a loamy character and is introduced into the mixer which breaks it up into increasingly small fragments as it progresses the material from the entering to the discharge end. As it does so, small batches or masses of the material are separated from the material in the mixer and thrown against the hot side walls of the cylinder, effecting evaporation of the surface moisture, much as the moisture is evaporated from one's finger in testing a hot iron, and the material then falls away to be mixed into the body of material in the drum, while other fragments are similarly thrown against the same or adjacent surfaces. The fragments or batches thus contact the surfaces haphazardly with the film of steam tending to prevent the filter cake from adhering or being spread over the interior surface of the drum. The steam thus liberated is drawn away either by vacuum or by the stream of purging air preferably heated before it has an opportunity to condense on the relatively colder mass of material in the drum. As the operation is repeated other batches or masses are thrown against the cylinder walls and thus have fresh wet surfaces to contact the hot metal so that as drying occurs the grains behave increasingly as individual particles presenting an overall increasing surface area, and the dryer particles mixing with wet ones reduce the overall moisture content of the mass to an optimum level.

The manufacturers of mixers of the type in which my first tests were run predicted that the heat transfer rate would not exceed 5 to 35 B.T.U. per hour per square foot per each degree Fahrenheit, and expressed an opinion that a mixer used as a dryer for the tonnage through-put of the filter cake which I was contemplating would be so large as to be impractical, or many smaller mixers would be needed. Contrary to their expectations, tests with typical ore concentrates which I provided indicated heat transfer rates of the order of 100 to 130 B.T.U's/hr./sq. ft./each degree F. With the iron ore concentrates with which tests run were made there was no substantial difference between operating with 20 or so inches of vacuum in the mixer drum and with a current of purging air flowing through the drum, so that because of the fewer apparatus complications to be met where air is circulated through the drum, the use of air appears to be preferable, but both are included within the scope of this invention.

Figure 2:
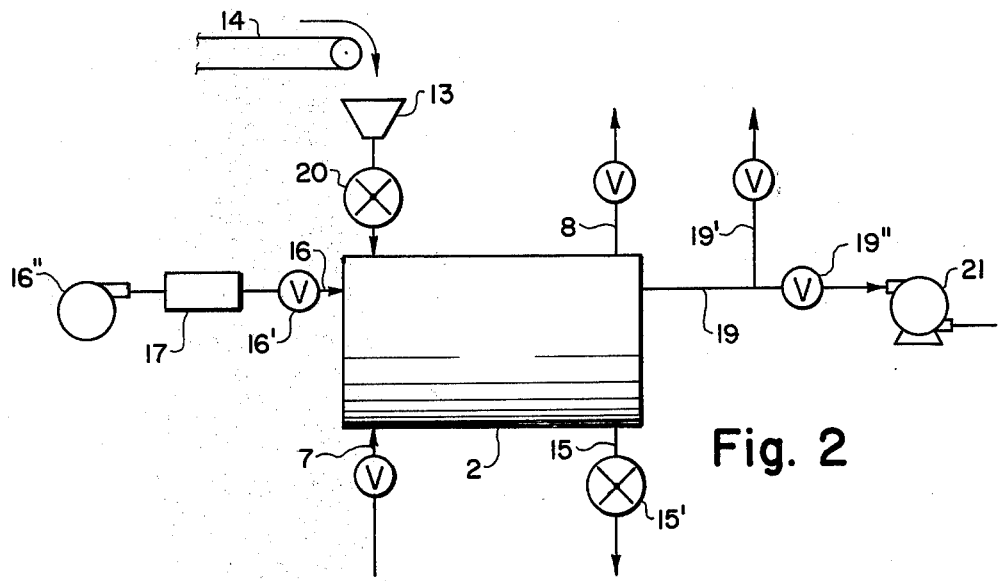

The invention may be more fully understood by reference to the accompanying drawing wherein:

FIG. 1 is a side elevation of a typical high-intensity mixer adaptable for the practice of this invention, part of the exterior of the outer wall of the apparatus being broken away to reveal the interior construction; and FIG. 2 is a schematic diagram indicating adaptations of the apparatus of FIG. 1 to the practice of my invention.

In the drawings 2 designates a mixer of a type available in the art, of the so-called "high-intensity" type as manufactured, for example, by Littleford Bros., Inc. of Cincinnati, Ohio with which much of our experimental work has been conducted, and a form of which is disclosed in U.S. Pat. No. 2,679,385 dated May 25, 1954. It comprises an elongate cylindrical drum 3 having its long axis horizontal or generally so, perhaps being inclined from the charging end, here indicated to be at the left, downwardly toward the discharge end at the right. It is carried in supports 4. The drum is enclosed in a jacket 5 spaced therefrom providing an enclosed space 6 around the walls of the drum for at least a substantial part of its length. A heating fluid, as for example steam or heated oil may be circulated through this jacket to heat the walls of the drum. A heated fluid inlet pipe connection for supplying heated fluid to the jacket is indicated at 7, and 8 is an outlet.

A shaft 9 extends axially through the drum and it has radial arms 10 therealong and angularly offset from one another around the shaft. At the end of each arm there is a paddle or scraper element 11 sometimes referred to as a "plow-share". At one end of the drum the shaft is connected with a conventional driving mechanism not shown.

At the charging end of the drum provision is made for continuously feeding the filter cake into the drum. This is here indicated to comprise a hopper 13 into which a conveyor means 14 of some type discharges the wet filter cake. At the bottom of the opposite or discharge end of the drum there is an outlet 15 through which the partially dried material is discharged from this end of the drum at a controlled rate. A star wheel, or similar discharge means is indicated at 15' for this purpose.

There is here shown a port or duct 16 with a valve 16' through which heated air from a heater schematically indicated at 17 is forced by a blower 16". Air so introduced into the drum may escape through discharge pipe 15 or a special outlet may be provided as indicated at 19. It is located at or near the discharge end of the drum and assures that moisture-laden air or steam will be withdrawn where the material in the drum is warmest so that cooling and condensation of water vapor by contact with cold material is reduced.

For the purpose of enabling one unit to be optionally used either by forcing a current of warm purging air through the inlet 16, or operating the apparatus at sub-atmospheric pressure, a valve 16' is indicated in FIG. 2 to exclude the influx of air through port 16. Also there is indicated a star wheel or bucket-type feed valve at 20 to reduce influx of air when operating at sub-atmospheric pressure or blow-back of air when purging with air pressure. The outlet pipe 19 has a valved branch 19' for use when the blower 16" is used and a valved branch 19" leading to an exhaust pump means 21 that is used when operating at sub-atmospheric pressure.

For production purposes the apparatus will normally be required to use only forced circulation of air or vacuum, so that only in special cases will it be necessary to employ selective vacuum or pressure methods of drying. Usually purging with a forced draft of air from a blower 16" will be preferred because of the greater simplicity of the apparatus than is required where sub-atmospheric pressure or partial vacuum is to be maintained in the mixer type unit.

In the practice of the method the rate of rotation of the shaft will depend on the diameter of the drum, the retention time of the material in the drum, and the rate of feed, among other factors, and no categorical limitation can be stated. In a test run on a Littleford Lodige Type Mixer, Model FM 130 mixer having an internal diameter of about 20 inches and a length of about 26 inches with 10 H.P. applied to the shaft which was rotated at 155 R.P.M., having 11 plows, and with a vacuum pump holding a vacuum in the drum ranging between 17.5 inches of mercury and 21.5 inches with the average just below 20 inches as determined by measurement taken at irregular intervals was used. With a single batch of 144.8 lbs. of iron ore including 10% water, with hot oil at 320°F. circulating through the jacket to heat the drum and with no added bentonite, the concentrate was reduced in 15 minutes to a lower than required 1.0%. In 20 minutes and a higher vacuum, averaging roughly around 21+ inches of mercury, the moisture in a similar sample was reduced to 0.3%.

In a similar test, using a stream of purging air moderately heated to about 200°F. flowing at about 55 c.f.m. a similar sample of the same weight and water content to that described above was dried to a moisture content of 1.3% in 15 minutes, using oil in the jacket at 325°F.

For pelletizing the concentrate it is quite unnecessary to reduce the water to the percentages above indicated, since some moisture is desired. The above tests indicated that a mixer of moderate size as contrasted to a unit of excessively large size as anticipated by those skilled in this art before the foregoing tests were run can be used where more or less continuous through-put is needed for tonnage production of filter cake concentrates that are to be subsequently pelletized. Tests have been run using the wet concentrate to which 1% of bentonite is added and have produced equally satisfactory results with none of the mix adhering to heated surfaces and inconsequential amounts adhering to uncooled surfaces. Since with many pelletizing operations up to 1% of bentonite is desirable in the pellets to develop adequate green state physical properties, the use of this mixer process as a dryer with desirable amounts of bentonite is also practical.

Based on the foregoing and other test data I have verified my theory that contrary to expectations and the predictions of persons eminently familiar with such equipment, so-called high-intensity mixers can be used to dry ore concentrates resulting as filter cake in those beneficiating refining operations in which filters are used to remove water from the concentrates, the agglomerating step can be significantly enhanced, and savings in bentonite and reduction in other operating costs can be realized through the production of green balls having better physical properties than the agglomerates produced without the benefit of partial drying. In achieving this result the feed of the material through the mixer requires that the drum be kept partially filled only to an extent no greater than the same apparatus is used merely for the blending or mixing of different ingredients and where it would be filled irregularly to perhaps roughly 50% of the internal volume, but depending of course on the character of the ore or other mineral being processed, as to its stickiness or viscosity and ease with which the material fragments as drying occurs.

The invention has been particularly described in connection with drying of iron ore concentrates for agglomeration, but is applicable also to other finely-ground or pulverized mineral substances from which excess water must be removed, particularly for agglomeration and the term "concentrate" as herein used is intended to include such other minerals unless otherwise specifically stated.

I claim:

1. Apparatus for reducing the moisture content in filter cake comprising:

a. a high intensity mixer having a horizontally-extending drum with a charging opening at one end and a discharge opening at the other end, the drum having a smooth interior surface and having an axial shaft therein with radial arms arranged therealong and spaced thereabout, the arms having plows that have a working clearance with the interior of the drum, the drum having means about the exterior thereof for heating the interior walls thereof, b. feeder means for introducing material to be dried at a controlled rate into one end of the drum while excluding the free influx of outflow of air, and means adjacent the bottom of the drum for discharging material which has been at least partially dried at a controlled rate from the other end of the drum while also preventing the free influx or outflow of air therethrough whereby controlled flow into and out of the drum may be effected, and c. the drum having means for controlling the circulation of air therethrough including an air inlet at the end of the drum into which material is charged and an outlet at the opposite end of the drum.

2. Apparatus for reducing the moisture content of filter cake as defined in claim 1 wherein said air inlet means comprises means for supplying heated air to the interior of the drum.

3. Apparatus for reducing the moisture content of filter cake as defined in claim 1 wherein there is an air heater and blower arranged to supply heated air to said inlet.

4. The method of removing excess water from ore concentrates and the like in the form of filter cake preparatory to agglomeration thereof comprising:

a. supplying the filter cake to be processed to one end of the fixed drum of a high intensity mixer having a heated jacket thereabout and having an axially-extending driven rotatable shaft on which are a plurality of spaced mixer arms each with a plowshare thereon and withdrawing it from the other, b. circulating a heated fluid through the heating jacket surrounding the drum to maintain at least some inner areas of the drum at a temperature above the boiling point of water, c. operating the mixer in such manner that the plow-shares of the mixer arms on the shaft rotating within the drum separate small fragments from the entire mass within the drum and throw them in continuous succession against the hot interior of the drum to effect substantially instant surface drying of those particles of each fragment which contact the inner surface of the drum and the fragments upon so contacting the drum then fall away or are knocked loose by the plow-shares on the mixer arms without spreading as a film over the interior of the drum, leaving its surface exposed to contact by the next portion of the material which is hurled against it, and d. continuously removing moisture vapor and steam from the interior of the drum near the end of the drum from which the material is withdrawn.

5. The method defined in claim 4 in which heated air is continuously forced through the drum from that end into which material is charged and removed from the end at which the material is discharged.

* * * * *